United States Patent [19]

Beck

[11] 4,310,322
[45] Jan. 12, 1982

[54] VARIABLE SPEED CLUTCH DRIVE

[75] Inventor: James P. Beck, Elgin, Ill.

[73] Assignee: Dana Corporation, Toledo, Ohio

[21] Appl. No.: 62,670

[22] Filed: Aug. 1, 1979

[51] Int. Cl.³ .............................................. F16H 55/52
[52] U.S. Cl. ........................................ 474/19; 474/46
[58] Field of Search ................... 64/29; 74/230.17 R, 74/230.17 A, 230.17 E, 230.17 M; 474/19, 46

[56] References Cited

U.S. PATENT DOCUMENTS

| | | | |
|---|---|---|---|
| 2,092,469 | 9/1937 | Oslund | 74/230.17 M |
| 2,145,083 | 1/1939 | Dynes | 64/29 |
| 2,678,566 | 5/1954 | Oehrli | 74/230.17 M |
| 2,699,071 | 1/1955 | Miner | 74/230.17 M |
| 2,790,525 | 4/1957 | Jaulmes | 192/3.5 |
| 2,987,934 | 6/1961 | Thomas | 74/230.17 E |
| 3,161,071 | 12/1964 | Getz | 474/19 |
| 3,287,987 | 11/1966 | Getz et al. | 74/230.17 M |
| 3,393,572 | 7/1968 | Larsson | 74/230.17 E |
| 3,605,511 | 9/1971 | Deschene | 74/230.17 E |
| 3,884,316 | 5/1975 | Bowers | 74/230.17 M |
| 3,996,811 | 12/1976 | Reese | 74/230.17 E |

Primary Examiner—Lawrence J. Staab
Attorney, Agent, or Firm—Frank B. McDonald; Robert M. Leonardi

[57] ABSTRACT

A variable speed clutch drive for light vehicles, e.g. motor bikes, snowmobiles, etc., responds to both engine speed and torque. The drive includes a conical pulley system of driver and driven pulleys coupled by a continuous V-belt. The driven pulley includes torque responsive means which utilize fixed and movable discs, the fixed disc containing radially arcuate apertures circularly disposed about its center of rotation. The discs are biased together by a spring system which includes a spring cover containing at least one integral cam for sliding contact with at least one aperture in the fixed disc.

5 Claims, 8 Drawing Figures

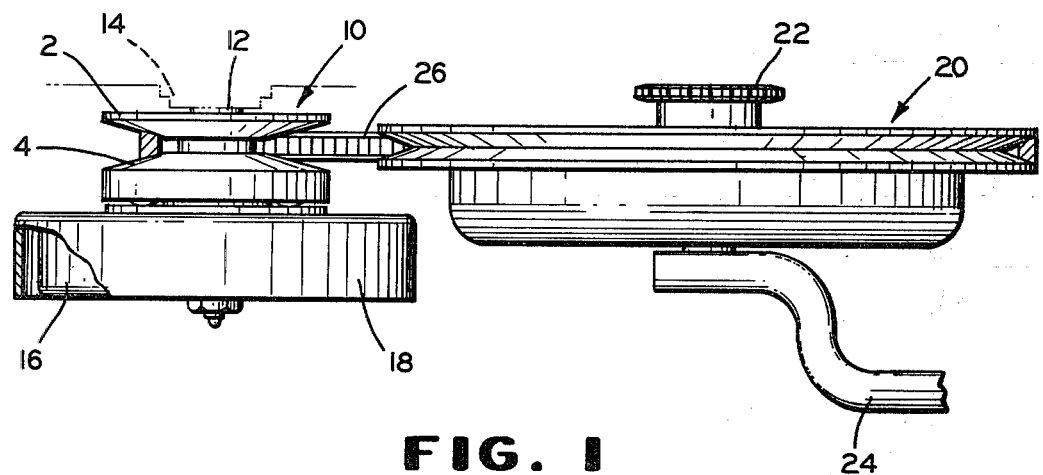
FIG. 1
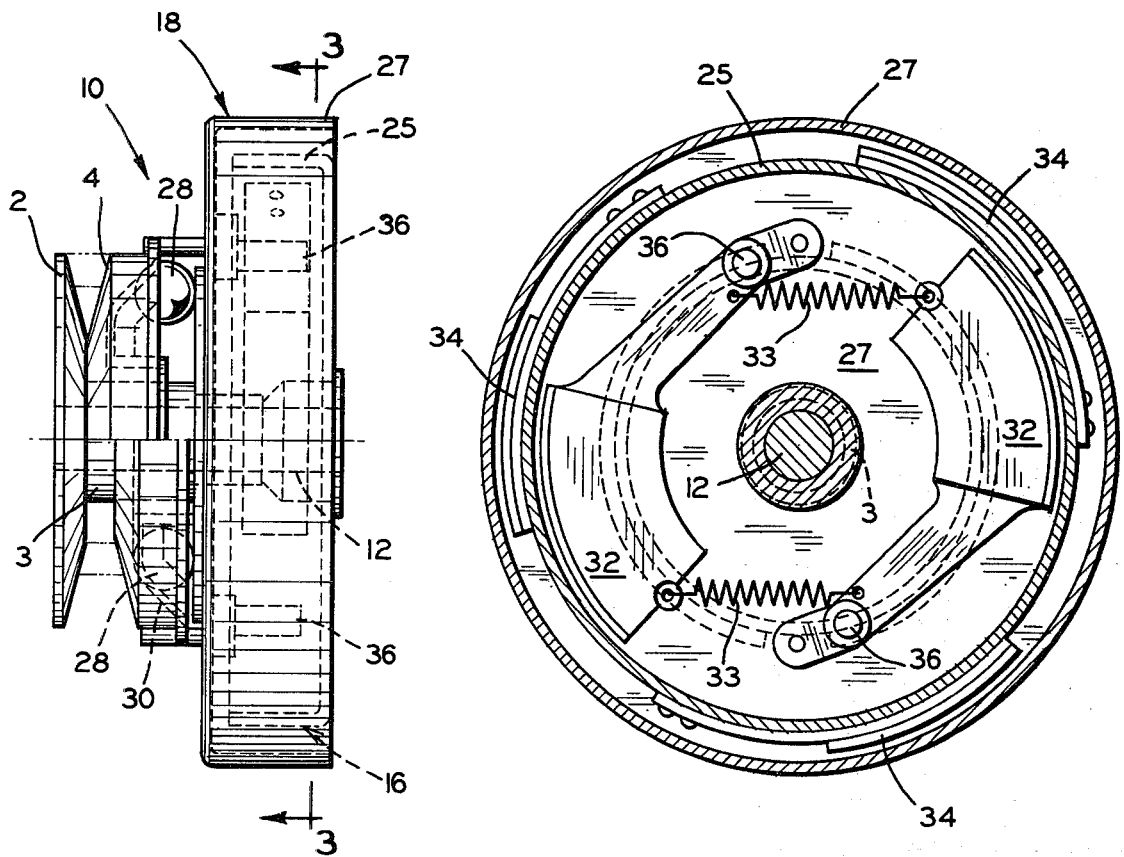
FIG. 2
FIG. 3

4,310,322

VARIABLE SPEED CLUTCH DRIVE

BACKGROUND

This invention relates to variable speed clutch drives, and particularly to those including engine torque responsive means. The conventional torque responsive drive incorporates a spring in the driven pulley assembly for urging an angularly and axially movable disc toward a second disc fixed to a driven wheel shaft. Increases in engine torque give rise to increases in belt tension, the latter producing an angular movement of the movable disc on the shaft. Axial movement is thereby induced by two interacting cam surfaces, one of which is fixed to the movable disc, the other to the driven wheel shaft. Thus, an increase in belt tension will rotate the movable disc through a small angle relative to the fixed disc, during which the movable disc will be urged toward the fixed disc by the cam surfaces to provide a low speed ratio when high torque must be delivered to the rear wheel as, for example, during acceleration of the vehicle. Upon reduction of belt tension, the movable disc will be urged away from the fixed disc, resulting in a speed ratio gain under conditions of decreased torque. Manufacture of the prior art cam mechanisms has proved to be fairly expensive, particularly the machining costs resulting from the close tolerances required. Moreover, prior art cam mechanisms have resulted in the addition of considerable weight and bulk to the driven pulley assembly.

DISCLOSURE OF THE INVENTION

The variable speed clutch drive as disclosed and claimed herein provides an inexpensive but very effective alternate to the weighty and bulky torque responsive mechanisms in conventional use. The mechanism of this invention is considerably more compact, the driven pulley shaft is shorter, and sheet metal parts can be used in both fixed and movable discs.

A preferred embodiment of the drive incorporates torque responsive means in the drive wheel hub. Radially arcuate apertures are circularly positioned about the center of a disc fixed to the hub. A movable disc mates with the fixed disc, the discs together defining a V-belt pulley. The movable disc rotates through a small angle and slides axially on the hub. The fixed disc is positioned intermediate the movable disc and a spring. Externally of the spring is a spring cover, the spring being contained between the fixed disc and the spring cover. The spring cover is rigidly affixed to the movable disc via integral cam-carrying connection means which extend through the apertures of the fixed disc. The spring cover is forced away from the fixed disc by the spring, thus urging the movable disc (fixed to the spring cover) toward the fixed disc. As torque is increased on the pulley via the V-belt, cams on the connection means provide additional force to urge the discs together. The cams interact with the edges of the arcuate apertures in the fixed disc, and the movable disc rotates relative to and slides axially toward the fixed disc to provide a low speed ratio.

BRIEF DESCRIPTION OF THE DRAWINGS

FIG. 1 is a plan view of a preferred embodiment of the variable speed clutch drive of this invention showing both driver and driven pulley assemblies.

FIG. 2 is an elevation view in section of the driver pulley assembly of FIG. 1.

FIG. 3 is a view along lines 3—3 of FIG. 2.

DETAILED DESCRIPTION OF A PREFERRED EMBODIMENT

Figure 4:
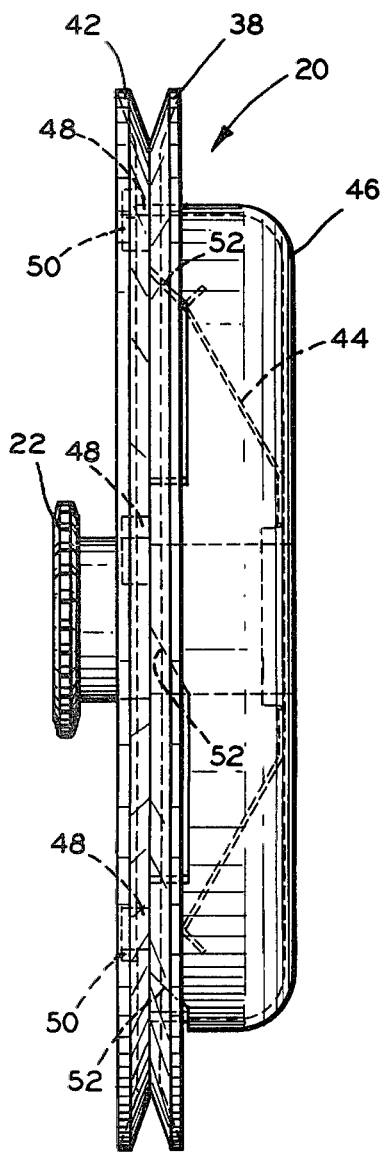
FIG. 4 is an elevation view in section of the driven pulley assembly of FIG. 1.

A preferred embodiment of the variable speed clutch drive of this invention is depicted in FIG. 1. A driver pulley assembly 10 is coupled to a crankshaft 12 of an engine 14. The assembly 10 includes pulley sheaves 2 and 4, sheave 2 being fixed to a hub 3 rotatable on the crankshaft 12 and sheave 4 being axially slidable on the hub 3. Outwardly of the pulley sheaves 2 and 4 on the crankshaft 12 as part of the assembly 10 are clutch units 16 and 18, respectively. A driven pulley assembly 20 is coupled to a driven wheel hub 22. The assembly 20 is drivingly connected to the driver pulley assembly 10 via V-belt 26.

FIG. 2 depicts the driver pulley assembly 10 of this invention. The slidable sheave 4 is urged axially on the hub 3 toward the fixed sheave 2 by centrifugal balls 28 of clutch unit 16 which, in turn, are urged by centrifugal force radially outwardly of the hub against cam ramps 30 as shown. V-belt tension operates as a counterbalancing force to urge the balls 28 back into their inward, or retracted, position. The interplay between engine speed and engine torque thus determine the position of the balls 28 along the ramps 30, hence the engine/wheel speed ratios for speed control, during vehicle operation.

Also shown in FIG. 2 is the aforementioned clutch unit 18 which includes a starter clutch cup 25 and drive clutch cup 27. FIG. 3 is a sectional view along lines 3—3 (FIG. 2) of the clutch unit 18 showing the positional relationships between the crankshaft 12 and the respective clutch cups. The starter clutch cup 25 is bolted to the crankshaft 12; the drive clutch cup 27 is keyed to the hub 3. FIG. 3 also shows starter and drive clutch shoes 32 and 34, respectively. Starter shoes 32 are pivotally connected to the drive clutch cup 27 by pins 36 (FIGS. 2 and 3). In order to start the engine, pedal cranks 24 are rotated, thereby turning the driver pulley assembly 10. The starter shoes 32 swing outwardly via centrifugal force against the tension of springs 33. At a predetermined speed the shoes 32 will frictionally engage the internal circumference of the starter clutch cup 25. At this point, the starter clutch cup 25 will begin to rotate and turn the engine via crankshaft 12 for conventional engine starting. After starting and upon reaching a predetermined engine speed, the starter clutch cup 25 will rotate rapidly enough to swing outwardly or distend the drive clutch shoes 34 from their respective rest positions on the external circumference of the starter clutch cup 25. Via centrifugal force, the riveted shoes 34 will engage the drive clutch cup 27 which will then also begin to rotate. As mentioned, the drive clutch cup is keyed to hub 3 to which is affixed the sheave 2 and on which sheave 4 is axially slidable. Thus as the drive clutch cup 27 rotates, the total driver pulley system 10 will rotate and through the V-belt 26 will operate to drive the driven pulley assembly 20 which is coupled to the driven wheel hub 22.

Figure 5:
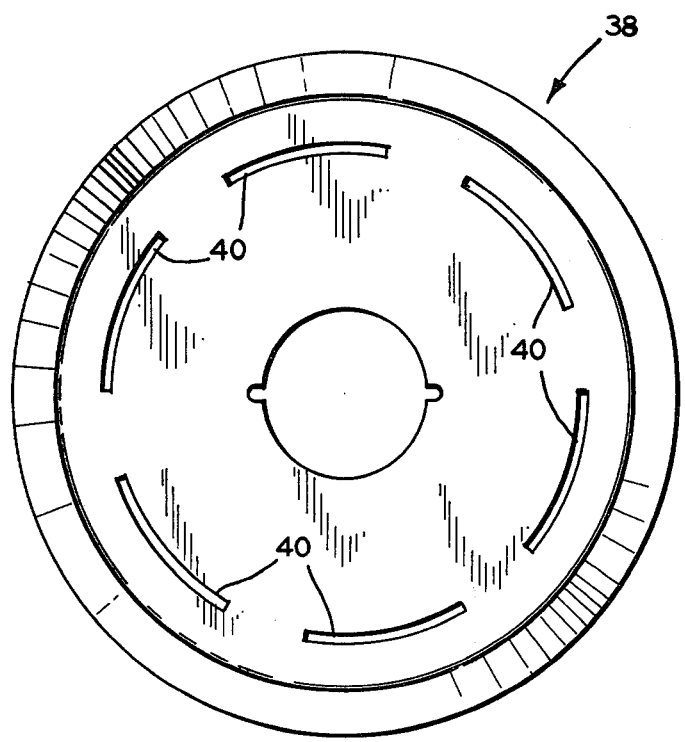
FIG. 5 is a view of the fixed disc in the driven pulley assembly of FIG. 4.
Figure 6:
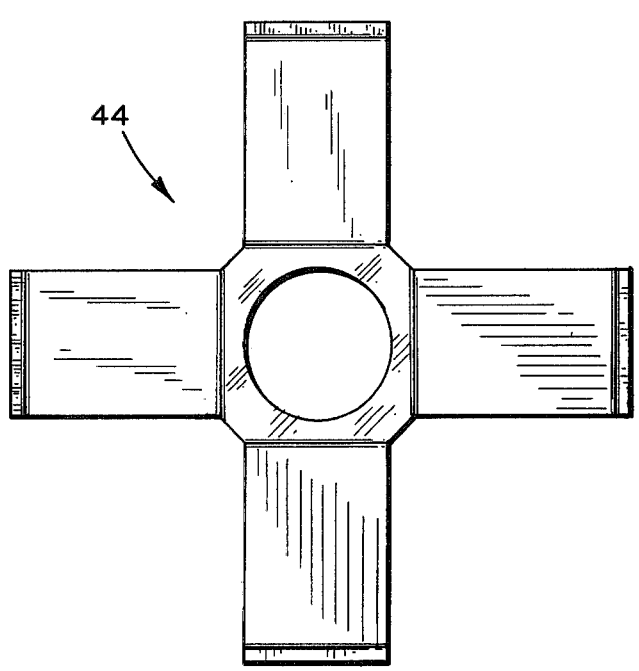
FIG. 6 is a view of the spring in the driven pulley assembly of FIG. 4.

FIG. 4 shows the driven pulley assembly 20 on the hub 22. A fixed disc 38 is rigidly connected to the hub 22. A frontal view of the disc 38 is shown in FIG. 5. Circularly disposed radially arcuate apertures 40 provide a torque cam to be described hereinafter. A movable disc 42 slides and rotates on the hub 22, and is disposed thereon for mating with the fixed disc 38; the discs together defining a pulley sheave for the V-belt. A spring 44 and a spring cover 46 are positioned over the hub 22 as shown in FIG. 4. The spring is separately shown in FIG. 6, the cover in FIG. 7. In FIG. 4, the assembled cover 46 is shown rigidly fastened to the movable disc 42 via connection means defined by arms 48 which extend through the apertures 40 of the fixed disc 38. The ends of arms 48 also extend through slots 41 in the movable disc 42 (FIG. 8), and are bent radially outwardly to form tabs 50 which lie against the outside surface of the movable disc 42 as shown in FIG. 4. Thus, it will be seen in FIG. 4 that as the spring 44 urges the spring cover 46 away from the fixed disc 38, the movable disc 42 (rigidly fixed to the spring cover) will be moved toward the fixed disc 38.

In order to minimize wear between moving parts of the driven pulley assembly, the use of a hub 22 made of a zinc alloy, such as Eastern Alloy No. ZA-12, has been found to provide a highly successful self-lubricating feature.

Figure 7:
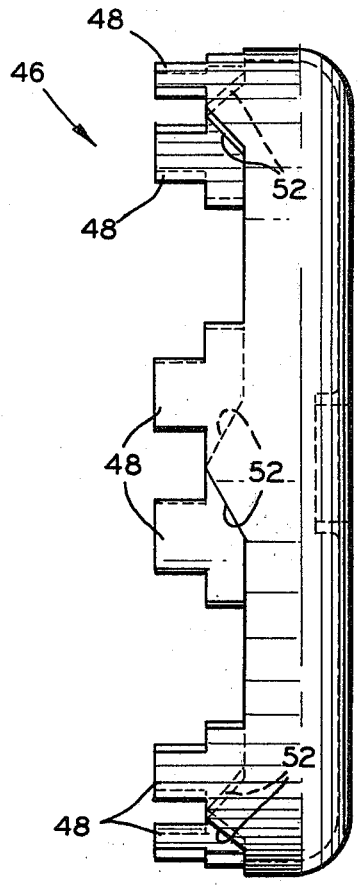
FIG. 7 is a view of the spring cover in the driven pulley assembly of FIG. 4, which includes integral cam means.
Figure 8:
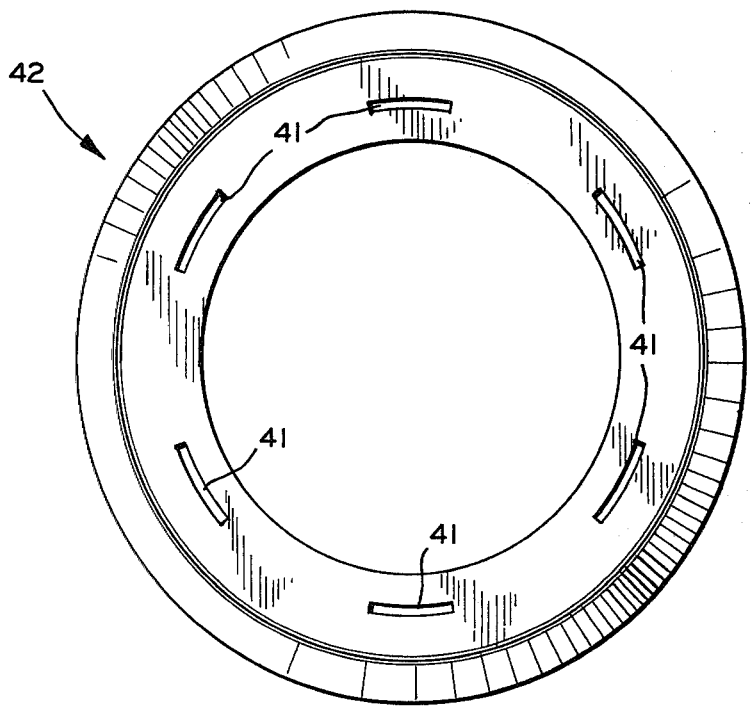
FIG. 8 is a view of the movable disc in the driven pulley assembly of FIG. 4.

FIG. 7 is a view of the spring cover 46 prior to assembly. Each of six arms 48 includes a cam 52 defined by an edge disposed at an angle to the arm 48, which after assembly extends through one of the apertures 40 (FIG. 5) of the fixed disc 38. Thus, now referring to FIG. 4, as belt tension increases, the natural result is for the discs to separate against the spring force under the increased belt tension. Instead, however, the cams 52 will add to the spring force by interacting with the edges of the apertures 40 to urge the discs together. As belt tension decreases, the movable disc 42 will rotate backwardly and be restored to its untorqued position relative to the fixed disc 38, and the V-belt 26 will encircle a smaller diameter about the driven pulley. Thus an increase in torque will urge the discs together to provide a low speed ratio, a desired control response to increased torque, as will be appreciated by those skilled in the art. Conversely, as engine torque decreases, the belt tension will decrease, and the speed ratio will be increased accordingly.

It may now be observed that control responses to speed and torque will result from the interplay between drive and driven pulley assemblies, 10 and 20, as follows. As noted previously, V-belt tension operates to urge balls 28 of driver pulley assembly 10 into their retracted position, whereupon the belt 26 encircles a smaller diameter about the driver pulley. Reduction of that tension allows balls 28 to move outwardly and thus increase the effective driver pulley diameter. Since the V-belt has a constant length, and the distance between the centers of rotation of driver and driven pulleys is constant, it becomes apparent that for an effective reduction of belt diameter of the driver pulley, there will be a corresponding increase in belt diameter of the driven pulley, and vice versa. Thus, the driven pulley diameter will be forced to decrease against the centrifugally created force of balls 28 in response to an increase in driver pulley diameter. Such increase will occur under a torque increase, as described. Upon a reduction of torque, however, there will be a belt tension reduction, and the centrifugal balls 28 will force an increased driver pulley diameter, with corresponding decrease in the driven pulley diameter. Engine load, of course, controls the torque level and thus the clutch drive configuration at any given moment during vehicle operation.

What is claimed is:

1. A pulley assembly comprising:
   (a) a first disc fixed to a hub, a plurality of circularly disposed radially arcuate slots contained in said disc,
   (b) a second disc moveable on said hub, coaxially mateable with said first disc and defining therewith a pulley sheave, said second disc further comprising a plurality of cams rigidly affixed thereto, each cam being disposed for sliding contact with an edge of one of said slots, and
   (c) a spring for biasing said discs together, a spring housing bearing against said spring, said spring housing rigidly connected to said second disc via connection means extending through said slots of said first disc.

2. The pulley of claim 1 wherein said connection means comprises at least one of said cam surfaces.

3. The pulley of claim 2 wherein said spring is positioned between said first disc and said spring cover.

4. The pulley of claim 3 wherein said spring comprises a leaf spring having four arms equally spaced about said hub.

5. The pulley of claim 4 wherein said connection means comprise arms axially extending through said slots, said arms having radially extending tabs at the ends thereof.

* * * * *